United States Patent [19]
Deacon et al.

[11] Patent Number: 5,119,186
[45] Date of Patent: Jun. 2, 1992

[54] COLOR MAPPING SYSTEM AND METHOD

[75] Inventors: John J. Deacon; Albert D. Edgar, both of Austin, Tex.

[73] Assignee: International Business Machines Corporation, Armonk, N.Y.

[21] Appl. No.: 413,918

[22] Filed: Sep. 28, 1989

[51] Int. Cl.$^5$ .......................... H04N 1/46; H04N 1/21
[52] U.S. Cl. ......................................... 358/78; 358/75; 358/433; 358/445
[58] Field of Search .................... 358/80, 433, 445, 81, 358/447, 460, 75, 78

[56]  References Cited
U.S. PATENT DOCUMENTS

| | | | |
|---|---|---|---|
| 4,232,311 | 11/1980 | Agneta | 358/81 X |
| 4,477,833 | 10/1984 | Clark et al. | 358/80 |
| 4,516,155 | 5/1985 | Hennig et al. | 358/80 |
| 4,613,948 | 9/1986 | Gharavi | 358/75 X |
| 4,712,141 | 12/1987 | Tomohisa et al. | 358/445 |
| 4,907,075 | 3/1990 | Braudaway | 358/75 |

Primary Examiner—Kenneth A. Wieder
Assistant Examiner—Glenn W. Brown
Attorney, Agent, or Firm—Robert M. Carwell

[57] ABSTRACT

RGB components of pairs of adjacent pels of a captured digitized image are averaged. A perceived color palette is constructed, each color being comprised of functionally combined RGB components of two different input palette colors. An array is formed of continuous colors, each indexed to the perceived palette color to which its RGB components are closest and indicating the two input palette colors defining the respective perceived color. RGB components for each averaged pel pair and the array index are then used to locate the perceived color closest thereto and, the two input palette colors corresponding to the perceived color. These two input colors are then substituted in a display for those of the two averaged pels and the process repeated for all averaged pel pairs. In a preferred embodiment, the difference between the perceived and averaged colors is diffused to adjacent averaged pels. An image is thereby readily produced having substantially more perceived colors than those available in the input palette.

23 Claims, 8 Drawing Sheets

INPUT COLOR PALETTE

| COLOR # | R(0-2⁵) | G(0-2⁵) | B(0-2⁵) | COLOR |
|---|---|---|---|---|
| ⋮ | - | - | - | |
| 4 | 4 | 7 | 8 | PINK |
| ⋮ | · | · | · | |
| 6 | 3 | 1 | 8 | CYAN |
| ⋮ | · | · | · | |
| 9 | 6 | 2 | 1 | BLUE |
| ⋮ | · | · | · | |
| ⋮ | - | - | - | |
| 16 | 7 | 9 | 2 | MAGENTA |

FIG. 14

| INPUT PALETTE ||||
|---|---|---|---|
| INDEX | RED | GREEN | BLUE |
| XXXXX | | N N N N N | |
| F | 26 | 26 | 26 |
| E | 26 | 26 | 2 |
| D | 25 | 2 | 25 |
| C | 2 | 26 | 26 |
| B | 19 | 19 | 19 |
| A | 26 | 11 | 0 |
| 9 | 0 | 11 | 26 |
| 8 | 8 | 8 | 8 |
| 7 | 0 | 0 | 19 |
| 6 | 0 | 19 | 0 |
| ⑤ | (19 | 0 | 0) — $R_n, G_n, B_n$ |
| 4 | 9 | 0 | 0 |
| ③ | (2 | 2 | 2) — $R_m, G_m, B_m$ |
| 2 | TEXT | | |
| 1 | TEXT | | |
| 0 | TRANSPARENCY | | |

91 PERCEIVED COLORS
(13 + 12 + 11 ... + 3 + 2 + 1)

| PERCEIVED PALETTE | | | |
|---|---|---|---|
| CC OO LL OO RR | RED | GREEN | BLUE |
| 12 | | | |
| FF | 26 | 26 | 26 |
| FE | 26 | 26 | 18 |
| ⋮ | | | |
| 55 | 19 | 0 | 0 |
| 54 | 16 | 0 | 0 |
| (53) | (13 | 1 | 1) |
| 44 | 9 | 0 | 0 |
| 43 | 7 | 1 | 1 |
| 33 | 2 | 2 | 2 |

COLORS 5 & 3 FROM TABLE 2 → 53

5 x 5 x 5 ARRAY

| ARRAY RED | INDEX GREEN | BLUE | VALUE HEX |
|---|---|---|---|
| 0 | 0 | 0 | 33 |
| 0 | 0 | 1 | 33 |
| 0 | 0 | 2 | 33 |
| ⋮ | | | |
| (15 | 0 | 0) | (54) |
| ⋮ | | | |
| 31 | 31 | 31 | FF |

R, G, B VALUES OF PEL FROM CONTINUOUS COLOR SPECTRUM → 15 0 0

INDEX VALUE TO TABLE 3 ← 54

COLOR MAPPING SYSTEM AND METHOD

TECHNICAL FIELD

The invention relates to digital imaging, and, more particularly relates to systems and methods for enhancing images from a limited color palette.

BACKGROUND ART

In the art of digital image display and processing, it is conventional to provide a parallel color bus of, for example, 16 bits. At a given time and for a given "pixel" or pel of an image, the bus may carry simultaneously digitized values of red, green and blue (RGB) components of the pel, each having 32 levels, ranging in value from 0-31 or $0-(2^5-1)$. This range of $2^5$ red, $2^6$ green, and $2^5$ blue values $(=2^{5+6+5}=2^{16})$ gives rise to the need for the 16 bit bus.

High quality continuous full color resolution monitors and images are thus possible when each R, G, and B component may assume any value in the $0-(2^5-1)$ range. Display monitors are thus commonly encountered having a potential color palette, for example, of 256,000 possible colors. This is of course due to the numerous combinations of possible RGB values, given the wide range of values for each color component.

With the desire for increased resolution images, however, it is also not uncommon to encounter displays having in excess of 300,000 pels per image as, for example, in a 640×480 display (i.e. 307,200 pels). It may therefore be readily understood that tremendous memory and speed problems are presented when attempting to provide digitized image displays having both high color as well as high pel resolutions. Using the above examples, to display only one frame of such an image would involve storage and retrieval of 307,200 16 bit pels. In animation or full motion video requiring rapid display of numerous such images, these problems become even more serious.

For the foregoing reasons, the art has continuously sought techniques for producing higher resolution images while at the same time reducing the tremendous demands on the imaging system.

One approach has been to reduce the number of available colors in an input palette selected from the continuous palette to, say, 16, whereby the color of each pel might be specified simply by a 4 bit number. In this manner, a fixed input palette of 16 colors might be preselected each having stored, preselected RGB component values, thereby reducing the number of bits required to specify a particular pel. Although each selected color might be any desired color from the much wider palette of continuous color (in that its RGB components could be selected from the entire permissible range of the components), the limitation to a relatively small number of such preselected colors nevertheless created yet other problems. Often a very serious degradation in the image quality resulted, such as in the phenomenon of contouring wherein, for example, flesh tones could often appear splotchy in appearance. Thus, numerous techniques evolved in the art for diffusing error in an attempt to more closely approximate a continuous color image with a limited palette of input colors. One such technique is described in "A Procedure for Optimum Choice of a Small Number of Colors from a Large Color Palette for Color Imaging", published in the Proceedings of the Electronic Imaging 86 Exposition and Conference, Boston, Mass., Nov. 3-6, 1986, pp. 75-79, Institute for Graphic Communications, Boston, Mass.

Thus, for the foregoing and other reasons, a system and method were highly desired for simulating simply and rapidly from a limited color palette a visual image appearing to be formed from a more extensive color palette which was thereby perceived by the eye as being more pleasing and accurate.

SUMMARY OF THE INVENTION

RGB components of pairs of adjacent pels of a captured digitized image are averaged. A perceived color palette is constructed, each color being comprised of functionally combined RGB components of two different input palette colors. An array is formed of continuous colors, each indexed to the perceived palette color to which its RGB components are closest and indicating the two input palette colors defining the respective perceived color. RGB components for each averaged pel pair and the array index are then used to locate the perceived color closest thereto and the two input palette colors corresponding to the perceived color. These two input colors are then substituted in a display for those of the two averaged pels and the process repeated for all averaged pel pairs. In a preferred embodiment, the difference between the perceived and averaged colors is diffused to adjacent averaged pels. An improved image is thereby readily produced having substantially more perceived colors than those available in the input palette.

BRIEF DESCRIPTION OF DRAWINGS

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

FIGS. 14–17 are color palettes in accordance with the invention, comprised of Tables 1–4, respectively.

DETAILED DESCRIPTION OF THE PREFERRED EMBODIMENT

First a description of the theory of the invention by example will be provided with respect to examples applied to the digital audio field and then as applied to imagery. This will be followed by a simplified description of an embodiment on a broad conceptual level to illustrate the fundamental ideas of the invention along with an alternate simplified embodiment. This will then be followed by a more detailed description of the invention including a representative image capture and display system.

Figure 1:
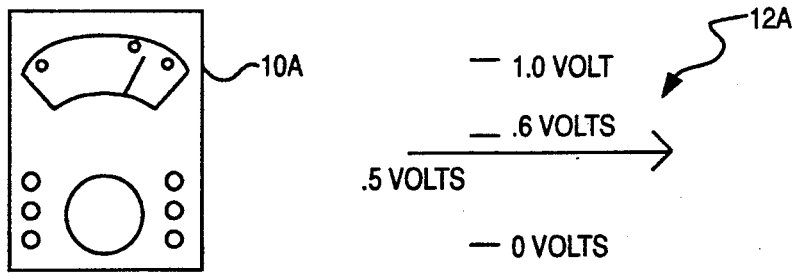
FIG. 1 is a schematic depiction of a prior art three quantization state system.

In order to illustrate the concept of the invention, it is helpful to first consider by way of example a simplified problem. With reference to FIG. 1, a schematic illustration of a signal generator 10A is shown having only three output states available, namely 0, 0.6 and 1 volt as shown at reference numeral 12A. It will be assumed that it is desired to create with the system 10A a constant signal of 0.5 volts given the limited "palette" of output states and assuming, for purposes of illustration, a standard digital audio sampling rate of 44.1 KHz.

Figure 2:
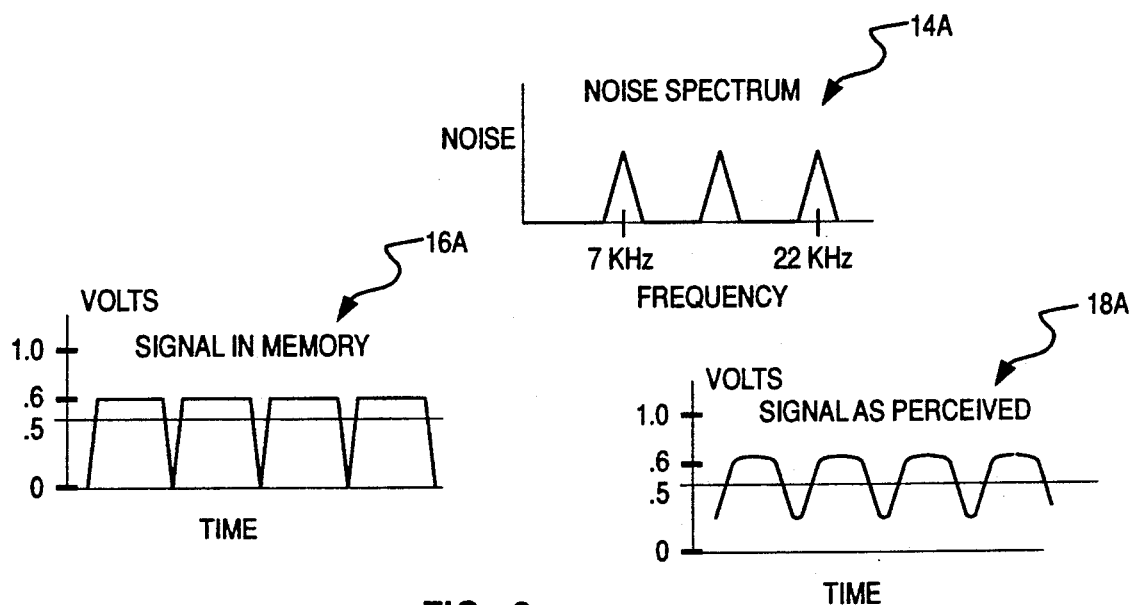
FIG. 2 is an illustration of a prior art implementation of signal emulation employing the three quantization states of FIG. 1, including a representation of the resultant perceived signal and correlative noise spectrum.

In FIG. 2 there is illustrated schematically an approach to the problem which might be taken by prior art solutions. Whether or not the approach chosen was error diffusion or dither, the net result in prior art systems is that the generator 10A would be configured to select the two closest states to the desired level and oscillate between them. In the case under consideration then, to recreate the desired 0.5 volt level, the system, in one solution, might output 0.6 volts five times for every one time it outputs the 0 volts state, as shown at reference numeral 16A, thereby producing the desired average of 0.5 with the minimum possible RMS error. The signal as it might be perceived would be as shown in reference numeral 18A. This solution would of necessity create noise obviously due to the limited number of output states. However, the problem with such a prior art solution is not the noise level but rather the noise frequency. Referring to the noise spectrum 14A of FIG. 2, it is apparent that in this example there is noise at 7.4 KHz frequency and at harmonics thereof which is clearly audible.

Figure 3:
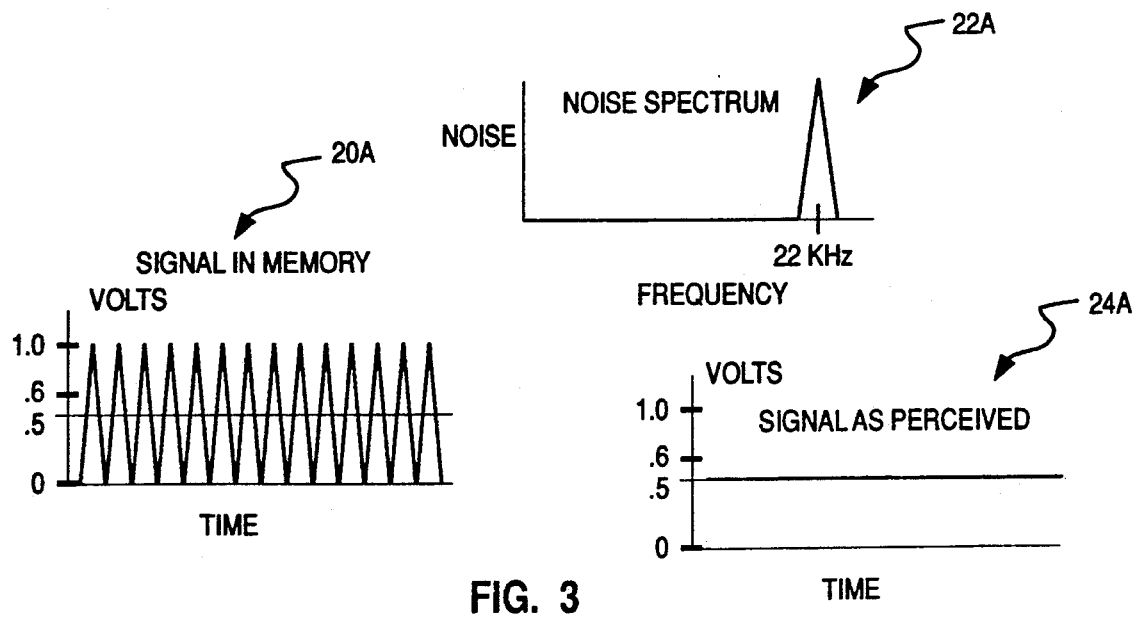
FIG. 3 is an implementation in accordance with the invention of the signal emulation problem of FIGS. 1 and 2 including a graphical representation of the resultant noise spectrum and the perceived signal.

Continuing with the illustration under consideration and referring now to FIG. 3, in accordance with the teachings of the invention a radically different solution would result wherein states might be chosen which were not among those closest to the desired 0.5 level. This is to be contrasted with the prior art solution wherein the 0.6 volt level, which was closest to the desired 0.5 volt level, was selected most frequently with an occasional 0 volt state to offset the excess of the 0.6 volts over the 0.5 volts. In the solution which would be presented by the subject invention, states would be selected which averaged to the desired level in the shortest period of time as illustrated at reference numeral 20A of FIG. 3. The system 10A might thus mix the 0 and 1 volt states at the sampling frequency because these states permit the correct average of 0.5 to occur in just two cycles, rather than the six cycles required by the prior art example.

An important feature to be observed by the solution of the present invention is that the solution accordingly produces a signal with more RMS noise than the prior art method (specifically, approximately 7 dB). However, with reference to the noise spectrum at reference numeral 22A in comparison to the noise spectrum at reference numeral 14A of the prior art, it will be observed that in the solution employing the teachings of the invention all of the noise is at 22 KHz whereby, in the practical world, it could be attenuated by the audio system and ignored by the human ear. Accordingly, the observer would perceive a pure 0.5 volt signal as desired and as shown at reference numeral 24A in comparison to reference numeral 18A of FIG. 2.

Figure 4:
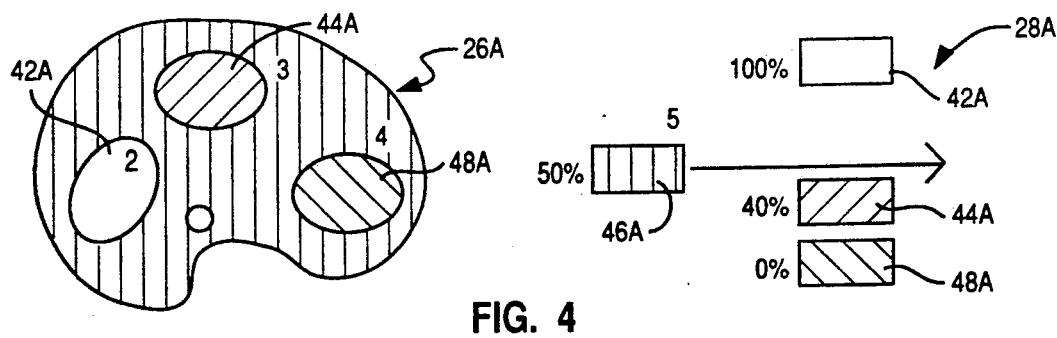
FIG. 4 is a schematic illustration of a limited input palette having three quantization states for emulation of an imagery signal.

Before proceeding to a more detailed description of a system of the invention, in order to insure that the fundamental concept of the invention is understood yet a second sample problem will be described with solutions provided by the prior art and the instant invention as applied to the imagery field. With reference to FIG. 4, analogously to the digital audio system of the prior problem, it may be imagined that in this case a visual system might have limited states such as a system only capable of reproducing pure black 48A, pure white 42A, and 40% grey 44A pels as shown by the palette at reference numeral 26A. It is desired to produce a visual display perceived as a 50% grey, 46A.

Figure 5:
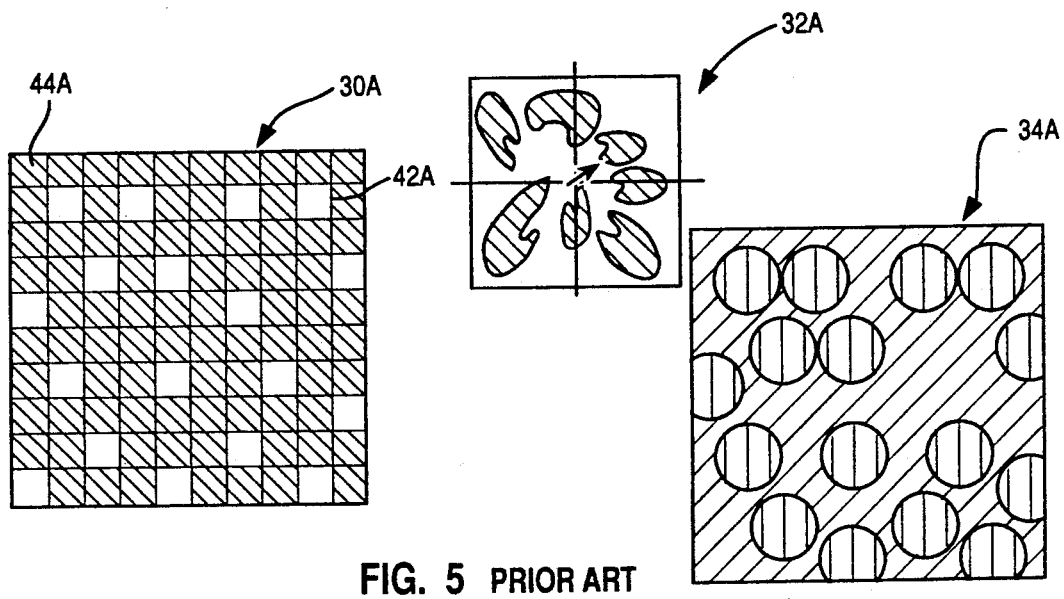
FIG. 5 is a prior art solution to an image signal emulation employing the three quantization states of FIG. 4 including the associated noise spectrum and perceived image of the solution.

Referring now to FIG. 5, there is illustrated a solution which might be provided by a prior art system. The system might be configured to oscillate between available states wherein the state closest to the desired 50% grey state at reference numeral 46A (namely that of the 40% grey state, reference numeral 44A) appears most frequently with the error between the two states being compensated for by occasional appearance of another state such as the white state at reference numeral 42A. Thus, specifically, the system might oscillate so as to place five 40% grey pels, 44A, for every one white pel, 42A, to achieve the desired 50% grey average. This solution may be recognized as being analogous in the imagery field to the prior art solution of FIG. 2 with respect to digital audio wherein the 0.6 state was selected most frequently as being the available state closest to the desired 0.5 state.

Continuing with the latter imagery problem, and again drawing analogy to the audio example, this oscillation between states will again produce noise in the spatial frequency domain. The exact location of the noise in the spatial frequency domain will of course be dependent upon the choice of dithering or error diffusion. However, again analogously to the audio situation, no matter how the white pel 42A samples are distributed, in this example there will always be some noise even within the low frequencies covered by the central quarter of the bandwidth. Thus, to the observer, the image will be perceived as a pattern of dots as represented by the image at reference numeral 34A.

Figure 6:
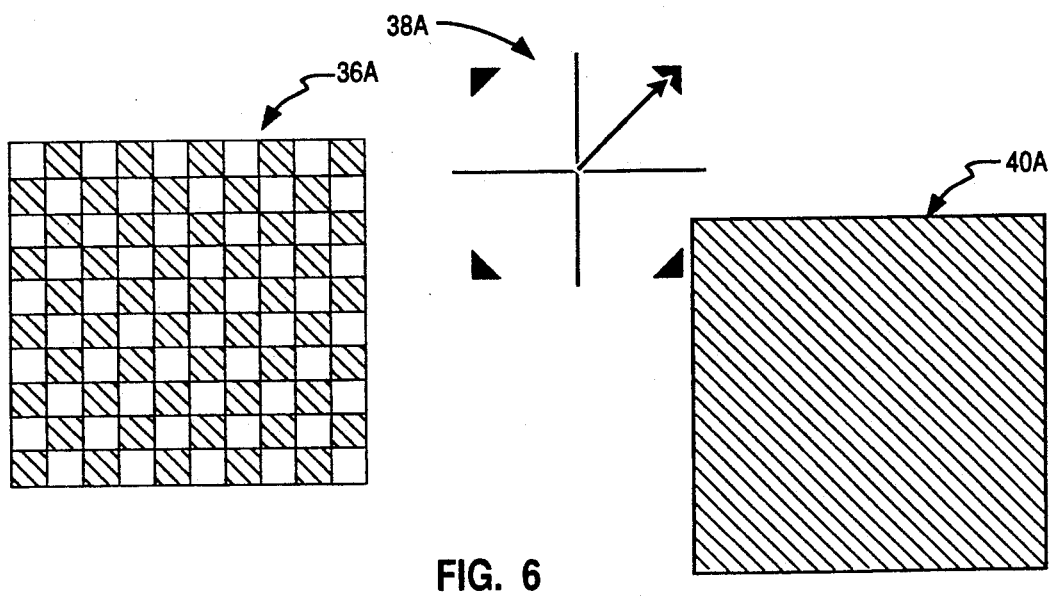
FIG. 6 is a schematic illustration of the emulation of the imagery signal of FIG. 4 employing the three quantization states in accordance with the invention including a graphical depiction of the associated spatial frequency noise spectrum and perceived image of the solution.

In FIG. 6, there is represented a solution which may be effected in accordance with the teachings of the invention. The invention would contemplate selecting the black and white states 42A, 48A to mix. Even though these are not the closest colors to the desired 50% pel, 46A, the correct average shade is obtained in only two pels rather than the six pels required by the prior art of the FIG. 5 example. Thus, referring to the image 36A of FIG. 6 it will be seen that the system of the invention would provide for alternating white and black pels in a checker board fashion. Although this produces a higher RMS noise, by alternating horizontally and vertically as shown therein, all the noise is confined to the extreme diagonal tips of the spatial frequency bandwidth as shown by the spatial frequency noise spectrum indicated at reference numeral 38A. These tips are 1.414 (square root of 2) times higher end frequency than the highest frequency the system can produce as a horizontal or vertical grating, and are normally both strongly attenuated by the display and ignored by the eye of the observer, whereby the desired 50% grey image is perceived as shown at reference numeral 40A.

In the spatial frequency noise spectra depicted at reference numerals 32A and 38A, it will be noted that arrow length corresponds to noise frequency. The effect of the prior art system and that of the invention may actually be conceptually perceived by viewing the FIGS. 5 and 6 as simulating the effect on a display as might be seen in the corresponding images of reference numerals 34A and 40A, where differing cross-hatching of an area refers to a different shade of the area, as in the case of FIG. 4. This approach of the invention with respect to visual images may be seen to be analogous to the case of FIG. 3 with respect to audio information wherein the samples selected to achieve the overall image are further from the desired sound level than another available sample. The invention thus converts a signal that is unquantized in magnitude to a sequence of available quantized states. This conversion is useful with palettized image display, digital audio compression, and the like. A key feature of prior art approaches was that the available quantized states closest to the desired unquantized signal were mixed together so as to average to the desired unquantized signal over some span.

In contrast, and in accordance with the invention, the selection of the quantized states to include in the average are selected so as to reach the desired unquantized level in the smallest span of samples, even though the states so chosen from those available may not be those that are closest to the unquantized level. Thus, although allowing more absolute noise, it is intentionally positioned with respect to the designed response of the system such that the noise will not be perceived by an observer of the system in that the noise is tightly confined to the highest frequencies of the system.

Now that a general theoretical basis of the invention has been provided, a description of two simplified embodiments of the invention will be provided before explaining a more detailed description of a representative system of the invention.

In the first specific embodiment or example of the invention to be described, it will arbitrarily be decided that an input color palette of thirteen colors will be provided to produce images with a color articulation which actually would require a much larger palette in the prior art. In the present example, it will be assumed that a display resolution of 640 pels horizontally by 480 pels vertically is available. The continuous tone image to be mapped will have exactly half the resolution, i.e., 320 pels horizontally by 480 pels vertically, and may be captured at this resolution or reduced from some higher resolution.

For simplicity, it will further be assumed that display pels may be grouped by twos, both overlaying one image pel. It will further be required that the average of these two pels be as close as possible to the image pel, whereby it may be said that the "averaging zone" covers two pels. In a more complex realization, however, the averaging zone could extend over a four pel square covering two pels horizontally by two pels vertically, or some other zone as desired.

Because it was decided to group pels by twos, not only are the thirteen original input colors of the input palette available, but also every unordered combination of two colors, or thirteen times 12 divided by 2, i.e., 78 additional colors. All of these colors preferably would distributed as uniformly as possible. Specifically, when selecting palette colors, the system of the invention would desirably avoid any color that could be made by averaging two other colors inasmuch as this would of course be redundant. In the context of an audio system, if the invention were selecting voltage levels in a digital audio system, it would avoid a regular placement of states as this regularity would given much redundancy as states were averaged two by two.

Next, the system would proceed to build a palette table consisting of all pairs of the thirteen colors, thus providing a total selection of 91 palette colors. Digitized representations of each of these palette colors would be stored with the darkest color first and the lightest second. Darkness and lightness may be calculated in accordance with methods well known in the art from the red, green, blue values using a standard luminance formula. The actual mapping of an image would proceed much as in the prior art. For every image pel, the system would look up the closest of the 78 palette entries, copy information defining the selected color pair to the display pels under the single image pel, and then would proceed with error diffusion or dither as in the common art. When the color pairs from the palette are copied to the display pels, it is preferable to form the diagonal checker board pattern of light-dark as per the prior example referring to FIG. 6. In order to do this, on even rows the first darker color would be copied to the left of its lighter pair, and on odd rows, the first darker color would be copied to the right of its lighter pair.

The foregoing example has assumed the original image was half the display resolution. Often, however, the original image is the full display resolution. Nevertheless, the system and method of the present invention may nevertheless still be applicable. Accordingly, now an example will be provided assuming both the original image and display resolutions are 640×480, with the same thirteen color palette be employed.

First, two look up tables could be created by the system, the first providing the closest color pair, (as in the previous description), and the other providing the closest of the thirteen colors as in the case of the prior art. If the row plus column is even, that pel may be considered as even, and if the row plus column is odd, that pel may be considered as odd. This creates a checker board pattern of even pels ordered as in FIG. 6.

Next the image would be scanned as before. On even pels, the closest color pair would be looked up as in accordance with the description of the just-presented prior example. The darker color of the pair would be placed in the image, where upon half of the error would be diffused vertically. This error would be based on the color pair average, even though the second color would not have yet been placed. The remaining portion of the error would then be diffused horizontally based only upon the single color that has been placed. On odd pels, the single closest color would be looked up, placed in the image, and then half the error would be diffused vertically and the remaining error diffused horizontally as in the prior art.

Thus, at even pels the system would commence a two pel sequence, diffusing vertical error based on the "promised" second color not yet placed, and diffusing a horizontal error that makes the next pel into the "promised" second color if the image color does not change. The alternating odd pels complete the two pel sequence by picking the closest color that, because of the fusion, compliments the first color with the "promised" second so the average of the two is correct. If however the image does change, a different closest color is chosen that best articulates the image detail, retaining full resolution.

Figure 7:
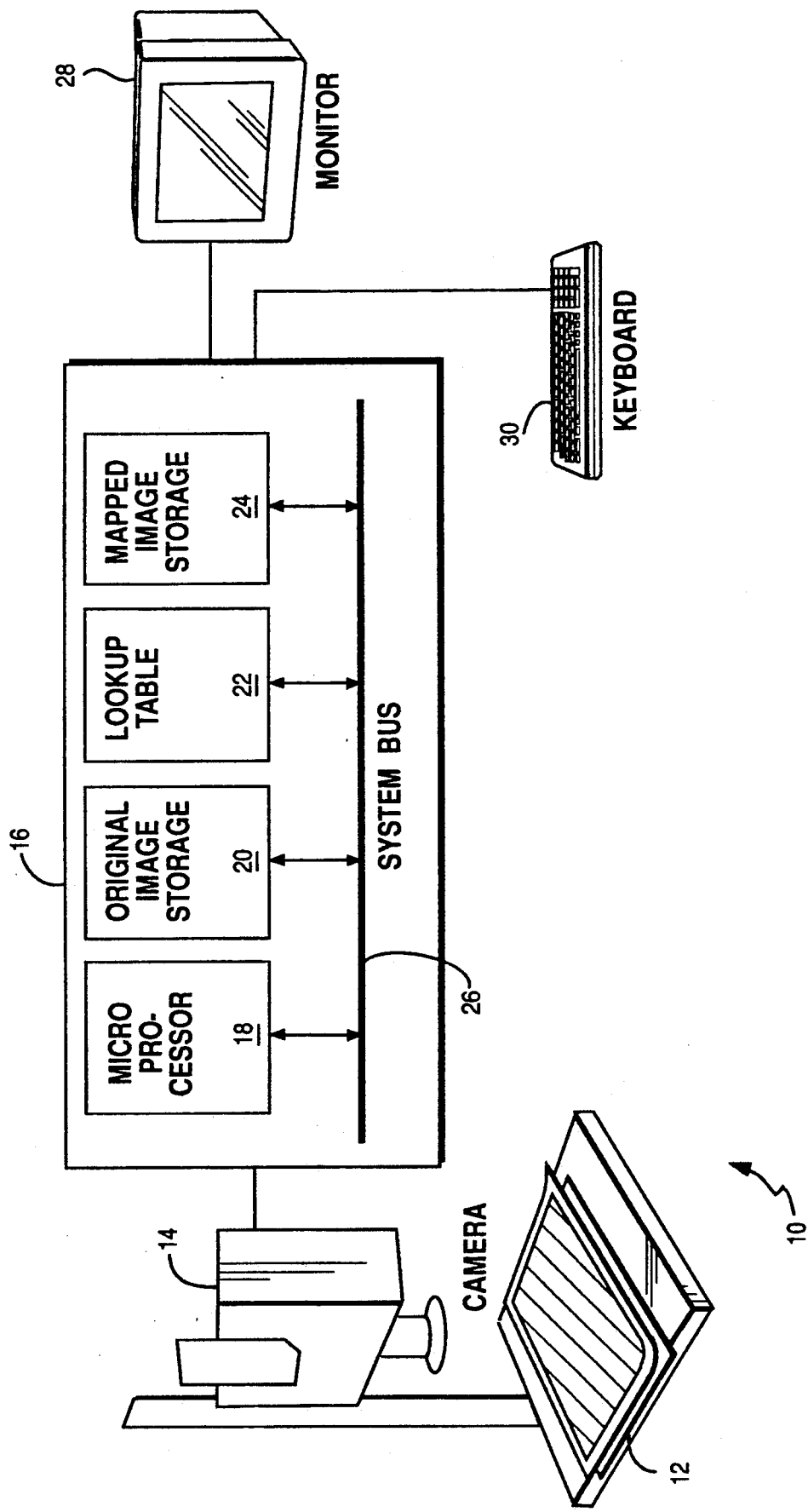
FIG. 7 is a high level, functional block diagram of the system of the invention.

Referring now to FIG. 7 for a more detailed description of the system and method of the invention, a computerized digital image capture and display system 10 is shown depicted therein for the mapping and display of digitized images in accordance with the invention. A computer 16 is provided for use in controlling the image capture, processing the digitized pel information, and controlling output of the processed image for display on a suitable monitor 28, all such functions being under control of an appropriate computer program to be described with suitable input being provided by a convenient input device such as keyboard 30.

Still referring to FIG. 7, the system further includes a camera 14 for conversion of an image 12 which is desired to be captured in electronic form for subsequent processing by the computer 16. The analog image data provided to computer 16 for digitization could equally as well have been pre-"captured" in analog form in video tape or disk and presented to the computer by an appropriate VCR, disk player or the like.

The computer of course will contain appropriate hardware and software for digitizing the analog image data from the camera 14 into the appropriate form for the processing. A representative system may include a Model 70 Personal System/2 computer, 8514 monitor, and appropriate software such as the Audio Visual Connection software by IBM, a video capture peripheral card installed in the computer 16, all such equipment being available from the International Business Machines Corporation, Armonk, N.Y. and a suitable camera such as a Model 300 CLE available from the Panasonic Corporation. Although the manner in which digital images are obtained or "captured" for processing in accordance with the invention is not considered a part thereof, such capability has been described herein for the sake of completeness. The digitized image could already be available to the computer in storage or on computer readable media.

The invention is not intended to be limited to any particular hardware/software system such as that hereinbefore described, but rather admits to implementation on many different systems, and accordingly the benefits of the invention may be enjoyed on essentially any general purpose digital computer having digitized image processing and display capability. With continued reference to FIG. 7, the computer 16 may be seen to include a microprocessor 18 and media which may be in the form of RAM, ROM, optical or magnetic disk storage, or the like, and combinations thereof. More particularly, this memory will include original image storage 20 which will store the raw and averaged digital captured image data. Further included in the system memory will be a lookup Table 22 and a mapped image storage 24. The various memory locations represented by the storages and Tables 20-24 may be accessible through conventional I/O techniques on a system bus 26 which interconnects to the microprocessor 18 in a manner well known in the art.

In terms of a general overview of the operation of the system 10, RGB component values for pels in the original image residing in storage 20 will be averaged by appropriate software operating in conjunction with the microprocessor 18. These averaged pel values will then be compared to locate respective perceived colors stored in the lookup Table 22 having RGB components most closely matching those of each respective averaged pair pel of the original image. Each of these perceived colors defined and stored in the lookup Table 22 may actually be generated by displaying a unique corresponding pair of input palette color pels proximally to one another which will be "blended" by the eye and thus perceived as having a certain perceived color. The input palette colors will be of a limited number and it is the various combinations of them which give rise to a larger number of RGB components of net perceived colors, each being stored in the lookup Table 22 along with the pair of input palette colors defining the particular perceived color.

Under microprocessor 18 control, when the perceived color in the lookup Table 22 has been located which has RGB components most closely matching those of two averaged pels from the original image 20 which were proximal to one another, the two input palette colors giving rise to this particular perceived color are thus noted from the Table 22 and stored in the mapped image storage 24 so as to correspond to and replace, in terms of spatial positioning, the two particular averaged pels from the original image 20. When the process has been repeated for every such averaged pair pel of the original image so as to fill the mapped image storage 24 with substitute input color pel pairs for each averaged original pel pair, this processed digital image data in the mapped image storage 24 may be output for visual display on the monitor 38.

Now that an overview of the operation of the system has been provided, a more detailed description thereof will follow along with a description of a prior art method of image mapping from which the novelty of the subject invention will become readily apparent.

From the foregoing, it will be recalled that due to various system constraints it is necessary in practical display systems to preselect an input color palette so as to have a more manageable number of colors with which to work in creating a digitized image. Accordingly as may be seen from the following Table 1, such a representative input color palette is depicted therein (only partially for purposes of clarity). Although the invention is not intended to be limited to any particular such palette, in the one illustrated it will be noted that any particular color of the 16 shown therein may be specified by means of a 4 bit nibble. With respect to each such color thus specified, it will correspond to a 16 bit word which may be carried on the system bus 26, each such word being comprised of R, G, and B components having values ranging from $0-(2^5-1)$. It will be recalled that the particular 16 colors thus selected from RGB values each having a range of (0, 0, 0) to ($2^5-1$, $2^5-1$, $2^5-1$) are a matter of choice.

Figure 8:
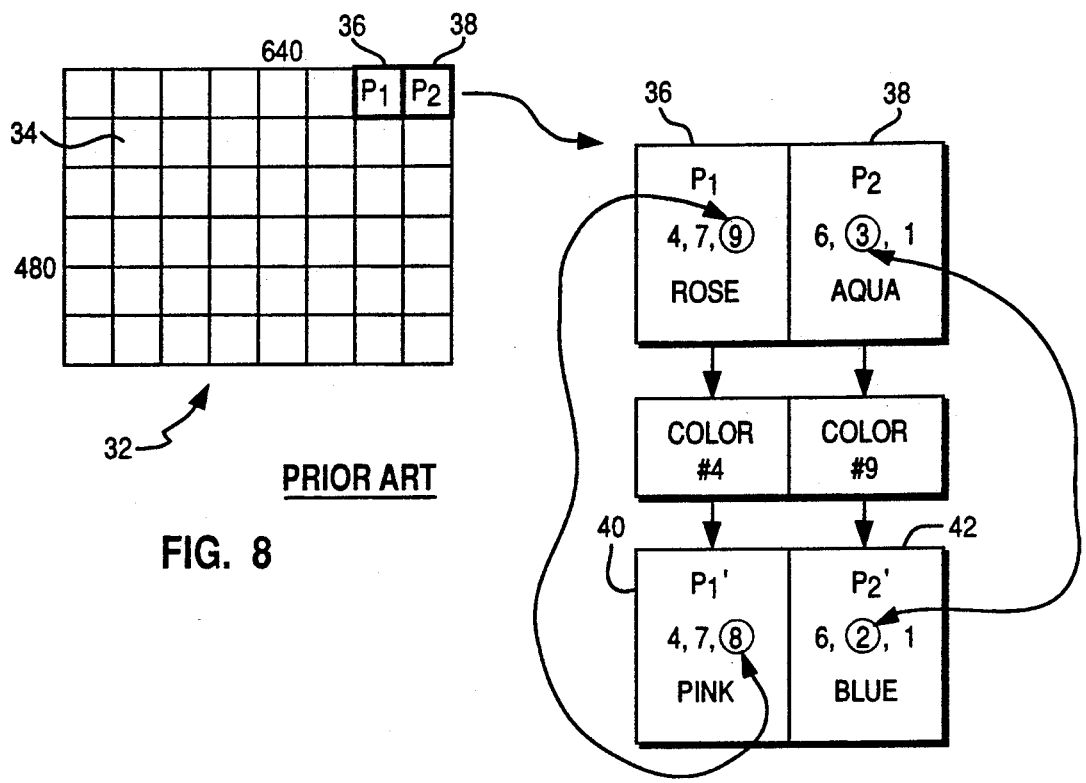
FIG. 8 is a schematic illustration of a color mapping technique of the prior art.

Referring now to FIG. 8, a schematic illustration of a display screen 32 of the monitor 28 is provided which is intended to illustrate that for a given digitized image visible on the monitor 28, it may actually be comprised of discrete pels from a continuous color spectrum such as pel 34 which are conventionally aligned in columns and rows (such as 640 columns by 480 rows). This gives rise to the convention designating such an illustrative image as being a "640×480" resolution screen. With respect to adjacent pels 36, 38, they have been shown schematically in FIG. 8 blown up to indicate that, for illustrative purposes, in a given image they may be comprised of a rose and aqua color, respectively, from a continuous color spectrum having RGB components of 4, 7, 9 and 6, 3, 1, respectively.

In prior systems, as common sense would dictate, with a limited color input palette such as that of Table 1, it would appear that the most straightforward way to emulate each of the pels of an original full color image would be simply to select for each pel a replacement pel comprised of a color from the input palette most closely approximating that of the continuous color pel to be substituted. Thus, using the example of FIG. 8 and Table 1, it appears that color #4 comprised of RGB components 4, 7, 8, most closely approximates the rose color 4, 7, 9 and accordingly one would substitute the $P_1'$ pink color of pel 40 for the pel 36. The names assigned to the RGB colors are for illustrative use only, and do not purport to represent their actual appearance on a display.

In like manner, an examination of the Table 1 indicates that the blue color #9 having RGB components 6, 2, 1 is the color in the limited input color palette of Table 1 most closely approximating the aqua color of the $P_2$ pel 38 having RGB components 6, 3, 1 and that accordingly, the pel $P_2'$, 42, having the blue color #9 would most closely approximate that of the pel 38. More importantly, however, it would further appear that the most accurate way to form an image most closely emulating that of the continuous color image 32, FIG. 8, with the limited color palette of Table 1 would be to continue this process of substituting for each pel of the image 32 a pel from the input color palette having a color most closely approximating that of the pel from the image 32.

Figure 9:
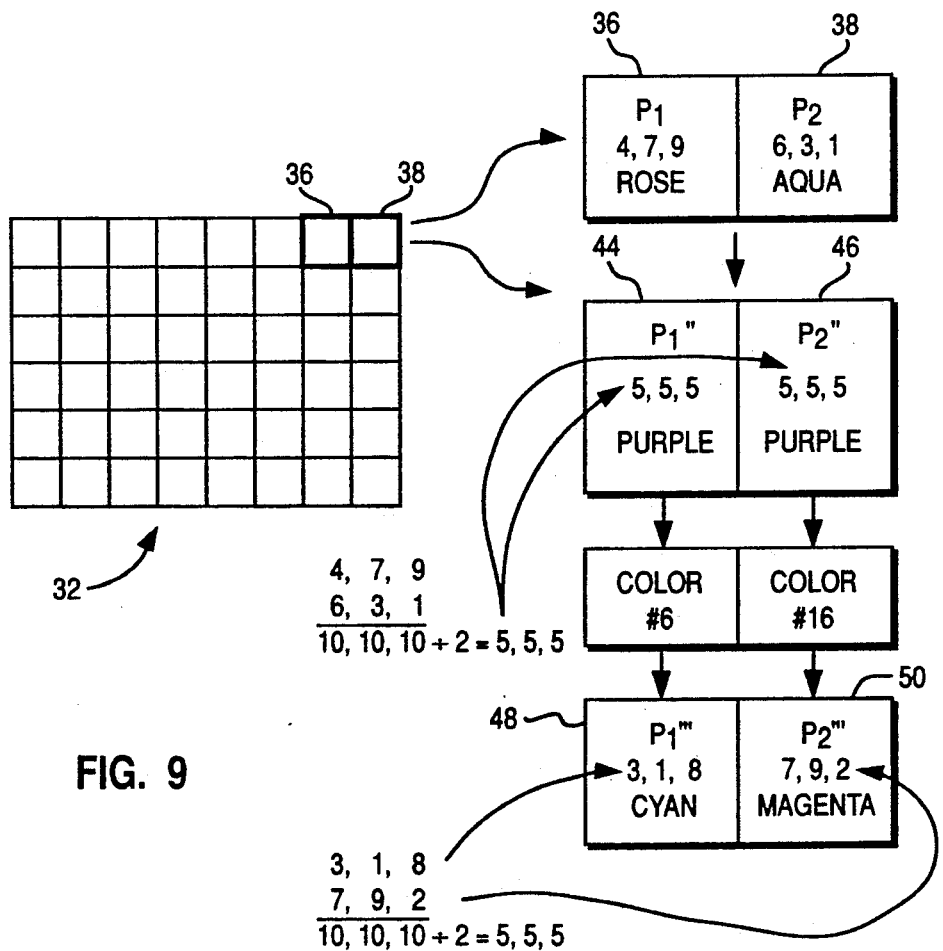
FIG. 9 is a simplified schematic illustration of the color mapping technique of the present invention.

However, with reference now to FIG. 9, a simplified illustration of another technique for emulating the original image 32 with the more limited palette of Table 1 will be hereinafter described. This example illustrates a principle technique of the invention which may yield superior results over the previously described method. In FIG. 9, once again, the pels 36, 38 of the image 32 are shown for clarity schematically blown up so as to indicate that they appear as the colors rose and aqua, respectively from the continuous color palette having the aforementioned 4, 7, 9 and 6, 3, 1 RGB component values. As further shown in the FIG. 9, the average RGB component value of these pels (i.e. formed by taking the average of the red components 4+6, green components 7+3, and blue components 9+1) yields an RGB component average of 5, 5, 5. In FIG. 9, these original pels 36 and 38 are shown as having substituted therefor, pels 44 and 46 (i.e. $P_1''$ and $P_2''$), such averaged RGB component values resulting in a color of a purple hue in the pels 44 and 46 corresponding to the RGB average of 5, 5, 5.

From an examination of Table 1, it will be readily apparent that a substitute color is not available from the limited input palette having RGB components equal to 5, 5, 5 and that to approximate this average in the conventional manner, a color would be selected from the color palette of Table 1 most closely approximating this purple color. However, further in accordance with the invention, it will be noted that color 6 and color 16 have been selected from the input palette having the cyan and magenta hues and corresponding RGB component values of 3, 1, 8 and 7, 9, 2, respectively, these values being provided in substitute pels 48 and 50 shown in FIG. 9 shown as $P_1'''$ and $P_2'''$. An interesting property of this selection of substitute input colors for the pels 44 and 46 may be seen by taking an average of the RGB component values for the cyan and magenta resulting in a net RGB component value of 5, 5, 5 (i.e. the average of the red components of cyan and magenta of 3+7, the green components thereof as 1+9, and the blue components thereof as 8+2). The interesting property is that although the substitute cyan color is substantially different from the rose and the averaged purple color of the original rose and aqua pels 36 and 38 and although the substitute magenta color of the pel 50 is substantially different from the original aqua pel 38 and resultant averaged purple pel, the averaged RGB component value of the substitute cyan pel 48 and magenta pel 50 (i.e. 5, 5, 5) is identical to the RGB component pel average of pels 36 and 38, notwithstanding that there is no single input color in Table 1 closely approximating the purple pel average.

Moreover, it has been found that in terms of physiology and the realistic and natural appearance of an image using the general substitute technique simplistically illustrated with reference to FIG. 9, a resultant image may often be superior to the more straightforward and seemingly common sense approach depicted with reference to FIG. 8. In essence, the rose and aqua pels of the original full color image may be perceived or averaged by the eye to appear as purple. A pair of colors from the input color palette are selected having an average which appears closest to the average of the original two pels. This is in contrast with the hereinbefore described prior art technique of simply trying to select a color from the input palette most closely approximating one of the original pels and a second color most closely approximating the remaining one of the original pels.

Now that a simplistic example illustrating the operation of the invention has been described, a more detailed illustration will follow with reference to the subsequent figures.

Referring now to the following Table 2, the table is a more complete and actual example of an input color palette providing 13 preselected colors having the indicated values for the red, green and blue components for each color. It will be noted that 3 bits are reserved in practice for superposition of text or transparency overlay images as desired.

As previously noted, due to inherent non-linearities including system bandwidth, the physics of electron guns in displays and bandwidth constraints of video amplifiers, the RGB component values for any two colors of the Table 1 when employed in a conventional manner to effect a display of proximal pels, will result in actual creation of pels on the monitor 38 having a color which is perceived to the eye as bearing a functional relationship to the components which is not necessarily simply an arithmetic average, but rather is a function of the particulars of the system under consideration. As but a simple example, if the input colors no. 8 (R, G, B=8, 8, 8) and color no. 3 (R, G, B,=2, 2, 2) were to be displayed, the net color of such adjacent pels would not necessarily appear to the eye as the color corresponding to the average of the RGB components $(8+2)/2$, $(8+2)/2$, $(8+2)/2$, or 5, 5, 5.

Accordingly, in accordance with the invention, a functional relationship may be empirically established for each given system whereby RGB components of pixels of given colors of the input palette, when applied to the function, will result three R, G, and B component values, whereby when these values are used to display a pixel, the color of the resultant pixel will be perceived as if substantially identical to simply displaying the preselected input palette colors in pixels proximally to one another. Accordingly, by employing this functional relationship for all combinations of input palette colors taken n at a time where n is small, such as two, (eliminating duplications), a perceived color palette may be constructed off-line such as that partially shown in the following Table 3.

It will be noted that although the invention is not intended to be limited to combinations of two input palette colors or to any particular functional relationship for establishing RGB color component values for a given perceived palette color from input palette colors, in a specific experimental system such as that previously described the following functions appeared to be quite successful in establishing a substantial improvement in the image quality by yielding a perceived $R_x$, $G_x$, $B_x$ color pel (a Table 3 row) from two given input palette pels $R_n$, $G_n$, $B_n$ and $R_m$, $g_m$, $B_m$ (Table 2 rows).

$$R_x = sqrt[((R_n+9)2 + (R_m+9)2)/2] - 9$$

$$G_x = sqrt[((G_n+18)2 + (G_m+18)2)/2] - 18$$

$$B_x = sqrt[((B_n+9)2 + (B_m+9)2)/2] - 9$$

It will, of course, be appreciated that the herein above noted functions, as previously indicated, are in turn a function of the particularities of the specific display system being employed, but that an entry in the perceived palette Table 3 may be generalized and represented as $$R_x, G_x, B_x = f(z)$$

where z is the RGB component values of 2 or more input palette colors, such as $R_n$, $G_n$, $B_n$ for a first such color and $R_m$, $G_m$, $B_m$ for a second such color in the input palette.

The perceived average of the two colors, $R_n$, $G_n$, $B_n$ and $R_m$, $G_m$, and $B_m$ will be the arithmetic average of the lumens for each color actually produced on the face of the display. Let the function f(c) be the transformation from the digital color in memory (c) to the actual relative lumens on the display (f(c)). This function will vary with the display and its adjustment, however for monitors used for television reception, it is controlled in manufacture, and comes close to lumens $= Kx(c+9)^2$, where c varies from 0 to 64 and K is an arbitrary brightness constant.

In accordance with the above discussion, to find the perceived average of the two digital colors $R_n$, $G_n$, $B_n$ and $R_m$, $G_m$, and $B_m$, first these digital colors are translated to lumens with the function f(c); the lumens are averaged; and finally the lumens are translated back to digital colors with the inverse function $f^{-1}(L)$, where L is in relative lumens.

Specifically, $$R_x = f^{-1}[(f(R_n) + f(R_m 9))/2]$$

or $$R_x = sqrt[((R_n+9)^2 + (R_m+9)^2)/2] - 9$$

repeated also for green and blue.

Employing the above noted formula in a specific example to illustrate the correctness of the entries in Table 3 relative to the input palette of Table 2, if it is assumed that the two input palette colors selected are colors no. 5 and 3 having respective RGB component values of 19, 0, 0, and 2, 2, 2, respectively, the above function yields a net R, G, B component value for a perceived palette color of 13, 1, 1 as follows:

$$R_x = 13 = sqrt[((19+9)^2 + (2+9)^2)/2] - 9 = 13$$

$$G_x = 1 = sqrt[((0+18)^2 + (2+18)^2)/2]18\ 1$$

$$B_x = 1 = sqrt[((0+9)^2 + (2+9)^2)/2] - 9 = 1$$

It will be recalled that one of the objects of the invention is to more closely emulate a color image formed from a more extensive palette with a display system having a more limited number of available colors with which to form the image. Thus, as shown in the following Table 4, an array may be formed, such as that depicted hereinafter in Table 4, wherein each row corresponds to a different one of the colors in the more continuous color spectrum to be emulated and, more particularly, includes the RGB component values for the continuous color. Also for a given row entry in the array, an index value may be included indexing to one of the colors in the perceived palette of Table 3 most closely approximating that of the continuous color (this perceived palette color, it will be recalled, being actually formed by a combination of two colors from the more limited input palette).

Once the above-noted array has been formed, it may be employed as illustrated in the following simple example. In Table 4, an entry having RGB component values of 15, 0, 0 will be noted which further include an index value of 54. This index value 54 will indicate that the perceived palette color 54 will be the closest color in the perceived palette of Table 3 to that of the continuous color having the 15, 0, 0 RGB component values. This perceived palette color 54, in turn, as indicated from Table 3, will have a respective RGB component of 16, 0, 0 which, by inspection of all the row entries in Table 3, will reveal that this selected perceived palette color has the RGB component values most closely approximating the 15, 0, 0 value of the continuous color in the Table 4. This continuous color 15, 0, 0 may be thus emulated most 25 closely by perceived color #54 having the perceived color 16, 0, 0. The perceived color, in turn, is created by proximal display of pels having color numbers 5 and 4 from the input color palette of Table 2. Such colors, with reference to Table 2, have respective R, G, B values of 19, 0, 0 and 9, 0, 0. These values when plugged into the empirical formula f(z) of course yield the 16, 0, 0 perceived color of Table 3.

As but another example, if it is desired to emulate a color in a more continuous color spectrum having RGB component values of 0, 0, 2, reference to the Table 4 will indicate that this hue may be most closely approximated with a perceived palette color by selecting the palette color corresponding to the index value 33 which, from reference to Table 3, will have a RGB component value of 2, 2, 2. Again, scanning the Table 3, it will be evident that no other color in the perceived palette shown in Table 3 has RGB component values more closely approximating that of the 0, 0, 2 color of Table 4. It will be noted that there will be more row entries in Table 4 than in Table 3 due to the fact that there are more colors associated with the continuous color spectrum represented by Table 4 than in the more limited spectrum of the perceived palette of Table 3. Accordingly, as may be expected, in that the invention is seeking to emulate these more numerous colors of the Table 4 with a more limited number of Table 3, a given color in the perceived palette must serve to emulate more than one color represented by Table 4.

Thus, referring again to Table 4, with respect to a more continuous spectrum color including 0, 0, 1, this color as in the case with the 0, 0, 2 color must also be represented by the perceived palette color 33 inasmuch as the RGB component values 2, 2, 2 of this perceived palette color 33 also happen to be the combination most closely approximating the continuous color 0, 0, 1 as well as in the previously noted example with respect to continuous color 0, 0, 2. This, in summary, explains the duplicate entry of the same index value (such as 33 in Table 4) for more than one row in Table 4 (each row, of course, corresponding to a different continuous color).

As but one further example for sake of completeness, if the continuous color having RGB component values 31, 31, 31 in the Table 4 array is sought to be emulated by a perceived color to be selected from the palette of Table 3, as indicated in the Table 4 array, the desired perceived palette color is FF which, from reference to Table 3, will have a RGB component value of 26, 26, 26. Again, scanning the Table 3, this indicates that no other color in the perceived palette of Table 3 will have RGB component values more closely approximating that of the 31, 31, 31 RGB component selected in Table 4.

One other important feature of these illustrative cross-referencing examples from Table 4 to Table 3 may be noted. First, by selecting a continuous color in the Table 4 to be emulated by a color in the perceived palette of Table 3, the index in the array to the perceived palette Table will, as illustrated previously, provide a convenient index to the particular perceived palette color most closely approximating that of the continuous color in the array. However, it will be recalled from previous discussion that this index value (such as FF, 54, 53, 33, etc. as in the previous examples) is in fact itself an entry or indicator into the input palette of Table 2. That is to say the perceived palette color number itself is an indicator of the input palette colors which when displayed as proximal pels will be perceived as the net single perceived palette color according to the empirical formula.

Thus, by associating a given continuous color to be emulated by the system of the invention with a particular perceived palette color by noting the index in the array to the perceived color, this index value automatically provides the substitute input palette colors which may be used to generate the perceived palette color. This is of significance when it is recalled that the actual colors which may be displayed on the monitor 38 at each pel are in practice limited to the input palette colors only of Table 2 and not the more numerous perceived palette colors of Table 3 (which are more numerous, it will be recalled, due to the fact that there are comprised of the combinations of input palette colors taken n at a time without duplication where in the case of Table 3, n=2).

Now that a general description of the input and perceived palettes and array has been provided, a more detailed description of the formation of an actual image in accordance with the invention will hereinafter follow.

Figure 10:
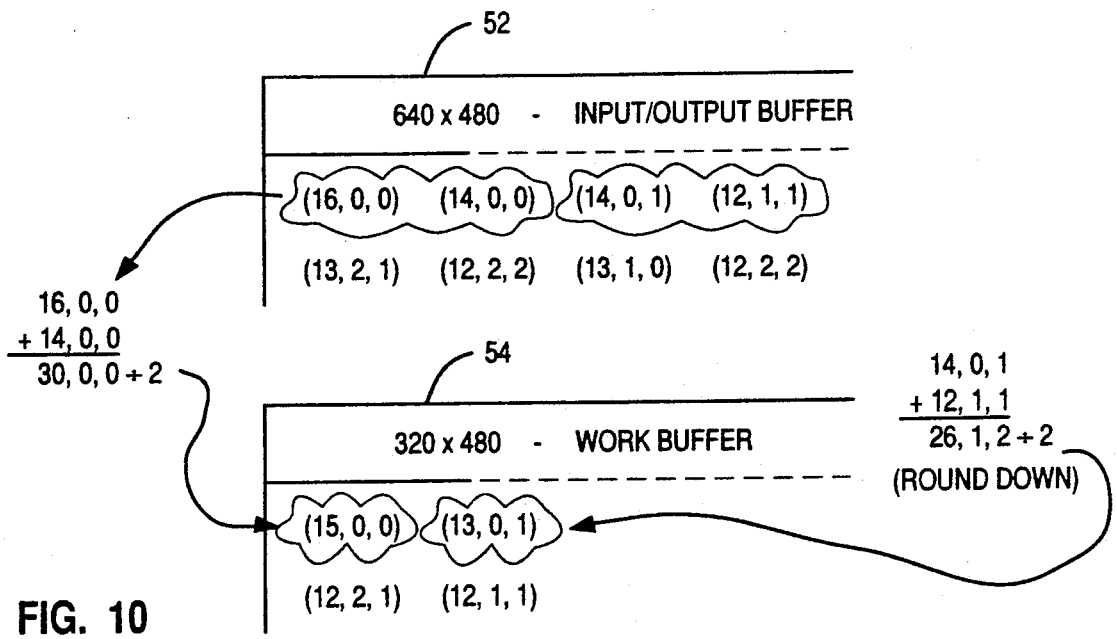
FIG. 10 is an illustration of a portion of a display indicating the step of pel averaging employed in the invention.

With reference to FIG. 10, an illustrative schematic illustration of a display screen on the monitor 28 is shown with typical RGB component values of pels being shown thereon spatially positioned similar to the way actual pels would be positioned on the monitor 28, such component values being shown in parenthesis. In the illustration at hand, a display with a 640×480 pel resolution will be provided although the invention is not intended to be so limited.

First, after construction of the aforementioned palettes and arrays, which may be stored in the look-up Table 22 of FIG. 7 and after capture of the image and digitization thereof with the component values of the pels for the image being stored in the original image storage 20 of FIG. 7, these pel values will be averaged by the microprocessor 18 and re-stored in the original image storage 20. More particularly, in one embodiment pel pairs horizontally adjacent one another will be averaged as in the case of the pel 16, 0, 0 and 14, 0, 0 shown at reference numeral 52 of FIG. 10 which averages to a pel having the value of 15, 0, 0 as shown at reference numeral 54 of FIG. 10. In like manner, continuing the example, the pels on the next line of display 52 of FIG. 10, namely the 13, 2, 1 and 12, 2, 2 pels, when averaged, will yield the averaged pel 12, 2, 1 (rounding down) shown at reference numeral 54 of FIG. 10. It will be readily apparent that continuing this averaging process will result in halving the resolution resulting in a 320×480 display at reference numeral 54 of FIG. 10. The pel values for these averaged pels as shown at reference numeral 54 will be stored in appropriate storage such as the original image storage 16 of FIG. 7.

The next step in the process of the invention is for the microprocessor 18 under appropriate software control to compare each thus-averaged pel to the previously described off-line generated array stored in the lookup Table 22 to find an entry therein having RGB components most closely corresponding to that averaged pel. In referring to the array of Table 4, it will be noted for example, that the first averaged pel in the upper left-hand corner at reference numeral 54 (i.e. the pel with 15, 0, 0 RGB components) is listed in the Table 4 along with an index value "54" to the perceived palette of Table 3. Referring to the "54" entry in Table 3 indicates that a perceived color having a RGB component value of 16, 0, 0 has been indexed to which obviously more closely corresponds than any other entry in Table 3 to the 15, 0, 0 pel in the array Table 4 and the averaged pel of reference numeral 54 in FIG. 10 sought to be duplicated.

Figure 11:
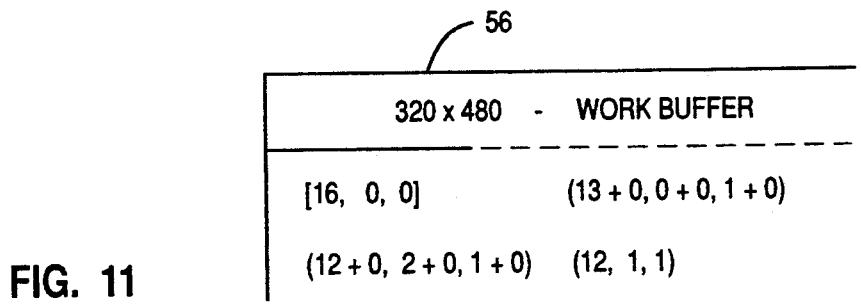
FIG. 11 is an illustration of the input palette color pair substitution step of the invention.

It will further be recalled from previous discussion that this thus indexed-to perceived palette color 54 (having the RGB components 16, 0, 0) may in fact actually be realized by adjacent display of the input palette color no. 5 (RGB of 19, 0, 0) and input palette color 4 (RGB components 9, 0, 0), Table 2. In FIG. 11 at reference numeral 56, it will be seen that the perceived color RGB of 16, 0, 0 has been substituted for the two averaged pels. A comparison with reference numeral 58 in FIG. 12 indicates that these two component input palette colors 5,4 (or more precisely, their corresponding RGB component values 19, 0, 0 and 9, 0, 0) have thus in turn been substituted for the perceived color pel of 16, 0, 0 of FIG. 11.

It was noted previously that inherently there will be error in R,G and/or B components of a given perceived color relative to those of the continuous color spectrum of Table 4 which is sought to be emulated due simply to the larger number of such continuous colors relative to those of the more limited perceived palette of Table 3. Thus, with respect to the example wherein the continuous color 15, 0, 0 is sought to be emulated by the perceived color 16, 0, 0, this error is comprised of one unit of red. In accordance with a preferred embodiment of the invention, all such errors between the continuous color and the closest perceived color will be diffused to adjacent pels in any of a number manners known in the art. In the example under consideration this error of one unit of red may be diffused to the pel immediately to the right and below of the averaged pel giving rise to the error, i.e. the 13, 0, 1 and 12, 2, 1 pels of FIG. 10, reference numeral 54, respectively. This would result in these averaged pels, including the one unit of red error, of 13+1, 0, 1 and 12 +1, 2, 1. However, when the process was continued to seek a perceived color in the perceived color Table 3, the closest matching this 13+1, 0, 1 pel, for example, this error would be of sufficiently small magnitude so as to not result in a perceived color selection any different than the original averaged pel of 13, 0, 1. It will readily be appreciated, though, that dependent on the particular pels of the original image, the input palette colors selected and resultant perceived palette, that these errors, when diffused, may be of sufficient magnitude to effect the outcome of the selection of the perceived color most closely approximating the averaged pel including the diffused error.

Figure 12:
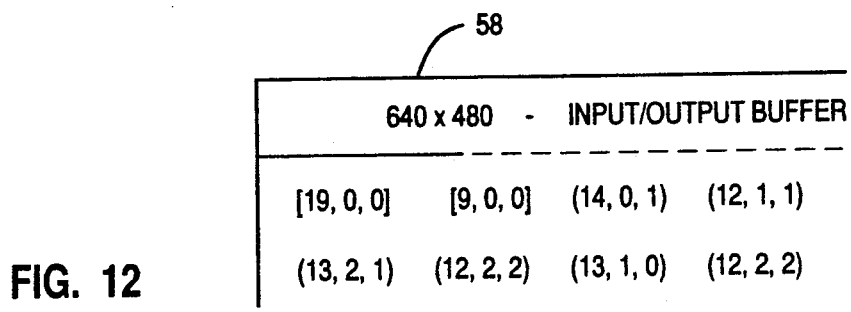
FIG. 12 is a further illustration of the input palette color pair substitution step of the invention.

With reference to FIG. 12, pels corresponding to these input palette colors 5 and 4 have been shown as substituting for the two original pels of reference numeral 52 of FIG. 10 (i.e. 16, 0, 0; and 14, 0, 0). The original unaveraged pels of reference numeral 52 of FIG. 10 have been shown reproduced in FIG. 12 ready for repetition of the process wherein the next two adjacent pels 14, 0, 1 and 12, 1, 1 are averaged to yield the averaged pel pair 13, 0, 1 of reference numeral 54 of FIG. 10. In like manner to the previous example with the prior averaged pels, this averaged pel 13, 0, 1 will be applied to the array of Table 4 to find the closest perceived palette color in Table 3 to this next averaged pel, whereupon the two input colors giving rise to this next-selected perceived palette color will be substituted for these two original continuous color pels 14, 0, 1 and 12, 1, 1. This process will continue until all pels on the row of the original input image stored in storage 20 have been processed, with the even rows being processed from one direction and the odd rows being processed from the opposing direction. Whereas for clarity in FIG. 12, unaveraged pels of FIG. 10 have been shown as a practical matter, it will be appreciated that it may be convenient to first convert all of the pels of the original reference numeral 52 image of 640×480 resolution to the averaged pels of the 320×480 resolution as shown in reference numeral 54 of FIG. 10 and to store this reduced-resolution image in the storage 20 before proceeding with the matching of these averaged pels to their corresponding perceived color pel in the lookup Table 22 and error diffusion. Further, with reference to FIG. 7 it should be apparent that as each perceived color is matched to the averaged pair pel of the original image and the two input palette colors corresponding to this perceived palette are determined from the lookup table, that this information is stored in a separate buffer corresponding to the mapped image storage 24 of FIG. 7, and that upon need for display of the mapped image, this processed digital information in the image storage 24 will be output by means of the system bus 26 to the monitor 38 for display.

It is a significant aspect of the invention that a lookup Table 22 is provided for translating the continuous color pels very rapidly to a pair of input palette color pels to substitute therefor due to many factors. First, as indicated in the background of the invention, with modern displays commonly being in the megapel resolution range, it can readily be appreciated that the alternative of calculating values associated with each pel on the fly would require too much processing time for all pels in the image, particularly when complex functional relationships such as that disclosed herein between the input palette colors and the perceived palette colors is involved.

Figure 13:
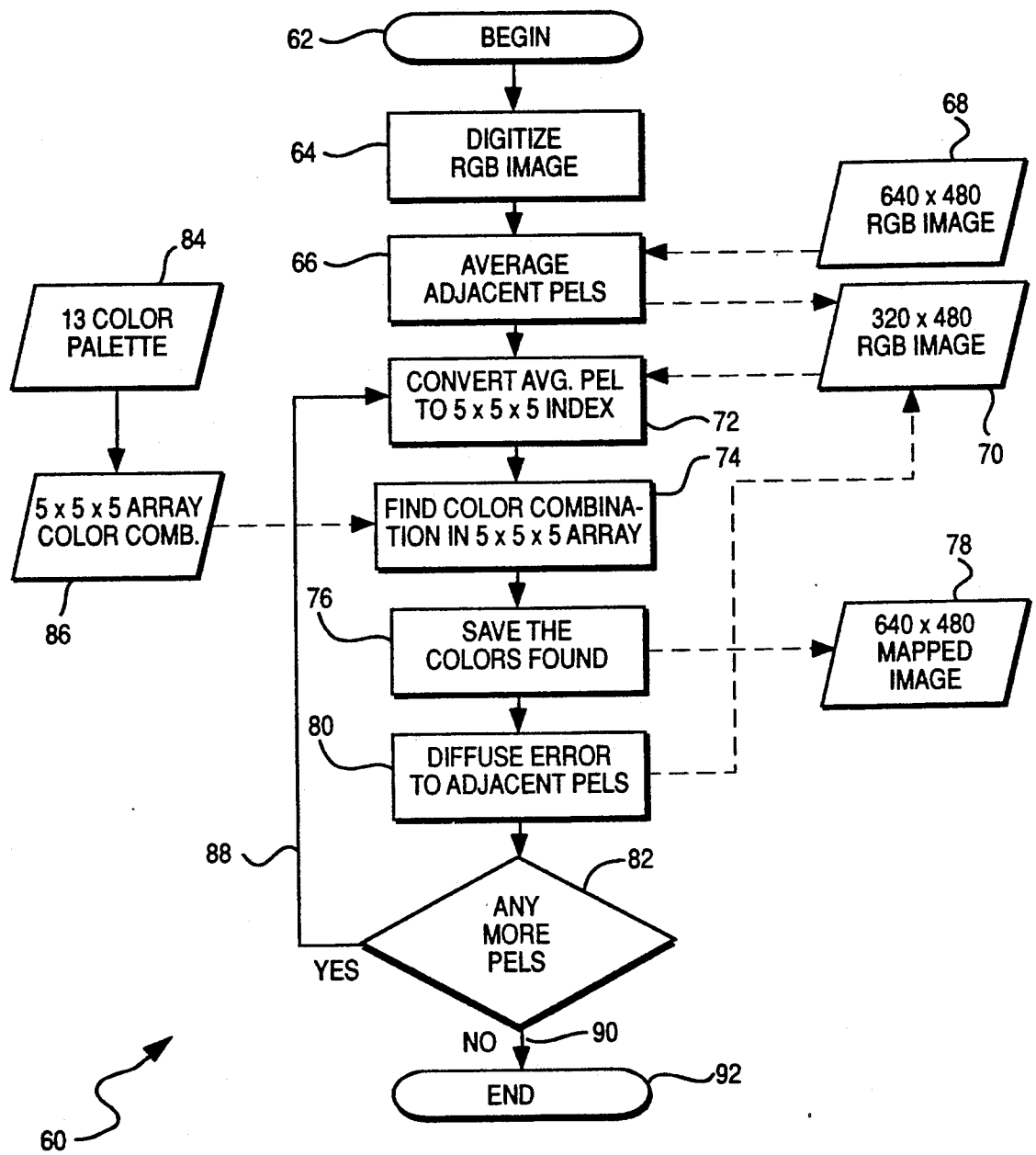
FIG. 13 is a flow diagram of a computer program for implementing the system of the invention.

Referring now to FIG. 13, a functional block diagram is depicted therein of a computer program which may be implemented in code in a manner well known in the art for performing the previously described illustrative functions of the invention. Before entering the process routine of the flow diagram 60, an input color palette such as that shown in Table 2 is selected as indicated at reference numeral 84 of FIG. 13 off-line. Once this limited color palette has been selected, an array is formed at step 86 also off-line such as that of Table 4 from combinations of the preselected input colors and the functional relationship f (z) used to arrive at perceived colors for combinations of the input colors. As in accordance with the previously described illustrations, the array table is built so as to have a plurality of entries each corresponding to a given color from a larger continuous color spectrum indicated by the RGB component values of the particular continuous color. Also associated with each entry will be an index value to a perceived color having RGB components most closely approximating those of the given continuous color of the entry. The perceived color will be represented by the RGB components of two or more input colors from the input palette after having been functionally combined in accordance with the selected function f (z).

When the routine of FIG. 13 is entered after having constructed the appropriate tables off-line, as shown at the Begin box 62, the system 10 of FIG. 7 is caused to digitize an image into a series of pels each having an RGB component as shown at block 64, whereupon this pel information is stored in the original image storage 20. This step of actual image capture or digitization is not necessarily considered to be an integral part of the invention inasmuch as a preformed digital image may have already been captured by means by CD-ROM or by some other media generally represented by the image storage 20.

After the digitized information of the original image has been stored, as shown at block 66, the computer 16 will perform an averaging of adjacent pels whereby the image at block 68 having a first larger resolution is thereby converted to a lower resolution as shown conceptually at block 70. Whereas this step has been indicated as a simple arithmetic averaging of adjacent RGB component values of pels, the invention is not intended to be so limited and contemplates the combining of pels which are proximal to one another in some functional manner, i.e. the pels need not be all adjacent pels, and the combining function need not necessarily be an arithmetic average, the feature being that RGB components of at least two proximal pels are functionally combined in some manner, the net result being an interim storage of digital information corresponding to an image of reduced resolution such as that shown at block 70.

Once the combining process of RGB components for proximal pels has been accomplished and the results stored in a temporary buffer such as in the image storage 20, one of these averaged pels is retrieved from storage as shown by the arrow from block 70 to block 72 whereupon the RGB component values for this averaged pel are compared to those of each color entry in the lookup Table 22, i.e. the array table built off-line previously such as that of the partial table shown at Table 4. As indicated at block 74, the RGB components of this averaged pel are compared to the RGB components of entries in the array table to find a color in the array table having RGB components most closely approximating a color in the array table, whereupon the index value is noted for that color.

It will be recalled that this index value was input into the table so as to correspond to a perceived color which visually most closely approximated continuous color of the Table 4. It will that of the further be recalled that this index actually indicates the input palette colors which were used to be functionally combined in accordance with the f (z) function to yield the perceived color. These input colors corresponding to the perceived color thus matched to the digitized averaged pel are saved as shown at block 76 and stored in the mapped image storage 24 of FIG. 7 whereby the input colors may be substituted in the original pels of the original image which were being averaged. In this manner, a 640×480 mapped image is being reconstructed as shown at block 78 of FIG. 13.

As also explained with reference to the preceding illustration, in the step of matching each averaged pel to a perceived pel color in the array table, any error is noted with respect to the R,G and/or B components of the perceived color and the corresponding continuous color in the array table, and this error is diffused to proximal averaged pels as indicated in block 80. Whereas in the example shown, the perceived color has been indicated as a function of two colors from the input color palette, the invention is not intended to be so limited. Moreover, also as previously noted, many error diffusing techniques exist in the art and it is not necessarily imperative that errors between the continuous color and corresponding perceived color be diffused in any particular manner or to any particular pels such as the adjacent pels as shown in the illustration, inasmuch as the invention admits to diffusion of such error in any number of techniques well known in the art.

Still referring to FIG. 13, in accordance with operation of the program functionally depicted in FIG. 13, a test may be performed at block 82 to determine whether the color of each such averaged pel has been looked up in the array table and matched to a corresponding perceived color, and further that the input colors from the input palette corresponding to the perceived color have been stored in the remade or mapped image at block 78. If no such averaged pels remain to be matched, the process exits at arrow 90 to end at 92. Alternatively, however, if the test at 82 indicates additional averaged pels have yet to be each matched to a closest perceived color and the corresponding input colors defining the perceived color, the process loops back as shown at 88 to continue this process. Upon its completion, a mapped image at 78 will thus be completed having digital information stored therein corresponding to pairs of input palette colors, each pair in turn corresponding to a pair of pels from the original image which have been averaged. Moreover, the particular input colors will be those which when plugged into the f (z) functional relationship will yield a perceived color closer than any other perceived color thereby defined in a similar manner to the RGB components of the average of the pair of original image pels.

In this manner, a mapped image will accordingly have been produced and stored in the image storage 24 having a pixel resolution corresponding to the original captured image which, in the illustration under consideration, is 640×480. However, whereas the colors forming the various pixels in the original image were varied throughout a large or essentially continuous color spectrum, the colors thereby selected in accordance with the method of the present invention will be of the far more limited input color palette. However, a key feature is that the precise colors selected from the input color palette to substitute for each pair of original image pels to be averaged are selected in accordance with the perceived color function so that when displayed adjacent one another, the eye perceives them to be very close to the color of the average of the RGB components of the two original adjacent pels. Inasmuch as, as previously described, this unique method of selecting input palette colors results functionally and perceptually in what amounts to a larger number of colors in the perceived color palette than available in the original input color palette, the resultant mapped image when displayed on the monitor 38 from the mapped image storage 24 will appear to have substantially improved color properties in the image than if each pel of the original image simply had substituted therefor a pel having a color from the original input color palette most closely approximating that of the original pel to be replaced.

While the invention has been shown and described with reference to particular embodiments thereof, it will be understood by those skilled in the art that the foregoing and other changes in form and details may be made therein without departing from the spirit and scope of the invention.

We claim:

1. A method for use with an image display system for generating a color mapped image from a first image of pels each having a plurality of color components, comprising:

preselecting a plurality of groups of said first image of pels, said pels in each of said groups being proximal to each other;

averaging respective color components of said pels in each of said groups;

preselecting an input color palette comprised of a plurality of input colors;

defining a plurality of perceived colors each functionally related to a different combination of said input colors;

associating with each group of averaged pels one of said perceived colors having associated therewith one of said combination of input colors; and generating a mapped image of said first image by substituting, for each pel of each of said groups, a pel having a different one of the color comprising said one combination of input colors.

2. The method of claim 1 wherein each said group of pels is a pair of pels.

3. The method of claim 2 wherein said pair of pels are adjacent.

4. The method of claim 1 wherein said different combinations of input colors comprise two input colors.

5. The method of claim 1 wherein each of said input colors is defined by a combination of input color components; and wherein each combination of said input colors is comprised of an average of said input color components of each said input color.

6. The method of claim 1 wherein each of said plurality of perceived colors defines corresponding color components; and wherein the step of associating one of said perceived colors with each group of averaged pels comprises selecting said perceived color for each group having said corresponding color components most closely approximating the averaged color components of said group.

7. The method of claim 6 wherein each of said perceived colors is defined by perceived color components and each said group of averaged pels is defined by averaged color components; and wherein said step of associating with each said group of averaged pels one of said perceived colors further comprises associating one of said perceived colors with one said group of averaged pels; and diffusing error defined by a difference between said perceived color components of the one perceived color and said averaged color components of said one group of averaged pels to a next group of averaged pels.

8. The method of claim 7 wherein said diffusing error occurs prior to associating one of said perceived colors with said next group of averaged pels.

9. The method of claim 8 wherein said next one of said groups is adjacent said one of said groups.

10. The method of claim 9 wherein each said perceived color is defined by a combination of perceived color components and wherein each of said input colors is defined by input color components; and wherein for each perceived color the respective said combination of perceived color components differs from associating one of said perceived colors with each group of averaged pels comprises selecting said perceived color for each group having said corresponding color components most clearly approximating the averaged color components of said group.

11. A system for use with an image display system for generating a color mapped image from a first image of pels each having a plurality of color components, comprising means for preselecting a plurality of groups of said first image pels, said pels in each said group being proximal to each other;

means for averaging respective color components of said pels in said group for each of said groups;

means for preselecting an input color palette comprised of a plurality of input colors;

means for defining a plurality of perceived colors each functionally related to a different combination of said input colors;

means for associating with each said group of averaged pels one of said perceived colors; and means for generating a mapped image of said first image by substituting, for each pel of each said group, pels of said one of said perceived colors.

12. The system of claim 11 wherein each said group of pels is a pair of pels.

13. The system of claim 12 wherein each pair of pels are adjacent.

14. The system of claim 11 wherein said different combinations of input colors comprise two input colors.

15. The system of claim 11 wherein each of said plurality of perceived colors defines corresponding color components; and wherein said step of associating one of said perceived colors with each said group of averaged pels comprises selecting said perceived color for each said group having said corresponding color components most closely approximating said averaged color components of said group.

16. A system for generating a mapped image from a plurality of input colors defining an input palette and a perceived palette, comprising means for storing a first original image;

means for averaging color components of subcombinations of pels comprising said first image to define a plurality of averaged pel subcombinations each having an associated averaged color;

means for storing an array of entries each corresponding to a different subcombination of the input palette colors defining a correspondingly different color of said perceived palette;

means for selecting, from said means for storing an array, for each of said averaged pel subcombinations, the perceived palette color most closely approximating said associated averaged color and said input palette colors defining said selected perceived palette color; and means for storing a mapped image comprised of said input palette colors defining said selected perceived palette color for each of said averaged pel subcombinations.

17. The system of claim 16 wherein each of said subcombinations comprise pairs of pels of said first image.

18. The system of claim 17 wherein said pels of said pairs are adjacent.

19. The system of claim 16 including display means for displaying said mapped image wherein each of said plurality of averaged pel subcombinations is replaced with a corresponding plurality of pels having said input palette colors defining said selected perceived palette color for each of the said averaged pel subcombinations.

20. A method for color mapping a digital original first image comprised of a plurality of pels each with corresponding R, G, B components, comprising the steps of generating a digital representation of a second image comprised of averaged pels each having R, G, B components corresponding to an average of R, G, B components of adjacent pels of said first image;

preselecting an input color palette comprised of a plurality of input colors each defined by respective input color R, G, B components;

generating a perceived color palette comprised of a plurality of perceived colors each defined by a functional combination of the input color R, G, B components of a different combination of said input colors;

generating an array having a plurality of entries each comprised of R, G, B components corresponding to a different color from a continuous color spectrum and an associated indicator indexing to one of said perceived colors having functional combination of R, G, B components which most closely approximates said R, G, B components of said different color from said continuous spectrum, said indicator further indexing to said different combination of said input colors which defines one of said perceived colors;

generating a stored mapped image comprising the steps of selecting for one of said averaged pels an entry in said array corresponding to one of said perceived colors having R, G, B components most closely approximating those of said averaged pel;

detecting from said entry said different combination of input colors defining the selected perceived color corresponding to said averaged pels;

substituting for said averaged pels said different combination of input colors;

storing digitally encoded representations of these said substituted input colors;

repeating the immediately preceding four steps of selecting, detecting, substituting and storing for each said averaged pels;

displaying said stored mapped image.

21. A method for approximating a desired output signal from a system having different magnitudes of input quantization states and a predefined frequency response, comprising:

generating an approximated output signal as a function of a combination of a selected plurality of said input quantization states, the selected states defining different magnitudes and each selected state being selected independent of the magnitude of the proximity of said selected state to the output signal.

22. The method of claim 21 wherein the selected quantized states are selected as a function of their respective magnitudes to minimize the number of said selected quantized states generating said approximated output signal.

23. The method of claim 21 wherein said output signal is an imaging signal.

* * * * *

UNITED STATES PATENT AND TRADEMARK OFFICE
CERTIFICATE OF CORRECTION

PATENT NO. : 5,119,186

DATED : June 2, 1992

INVENTOR(S) : John J. Descon et al

It is certified that error appears in the above-indentified patent and that said Letters Patent is hereby corrected as shown below:

Col. 12, line 10, delete "9";
        line 30, after "]" insert -- - --;
                after "18" insert -- = --;

Col. 17, line 41, after "approximated" insert --that of the--;

UNITED STATES PATENT AND TRADEMARK OFFICE
CERTIFICATE OF CORRECTION

PATENT NO. : 5,119,186
DATED : June 2, 1992
INVENTOR(S) : John J. Descon et al

It is certified that error appears in the above-indentified patent and that said Letters Patent is hereby corrected as shown below:

Col. 19, line 61, delete "associating";

lines 62-66, delete in their entirety and insert

--said average of said input color components defining each respective perceived color by a predetermined minimized amount sufficient for said perceived color, when displayed as a plurality of perceived color pixels each having said combination of perceived color components, to approximate color perceived on said image display system by display of pixels having said input color components of said respective input colors corresponding to the respective perceived color.--; and Col. 20, line 20, delete "each" and insert --said--.

Signed and Sealed this

Twenty-fourth Day of October, 1995

*Attest:*

BRUCE LEHMAN

*Attesting Officer*     *Commissioner of Patents and Trademarks*